Patented Dec. 12, 1944

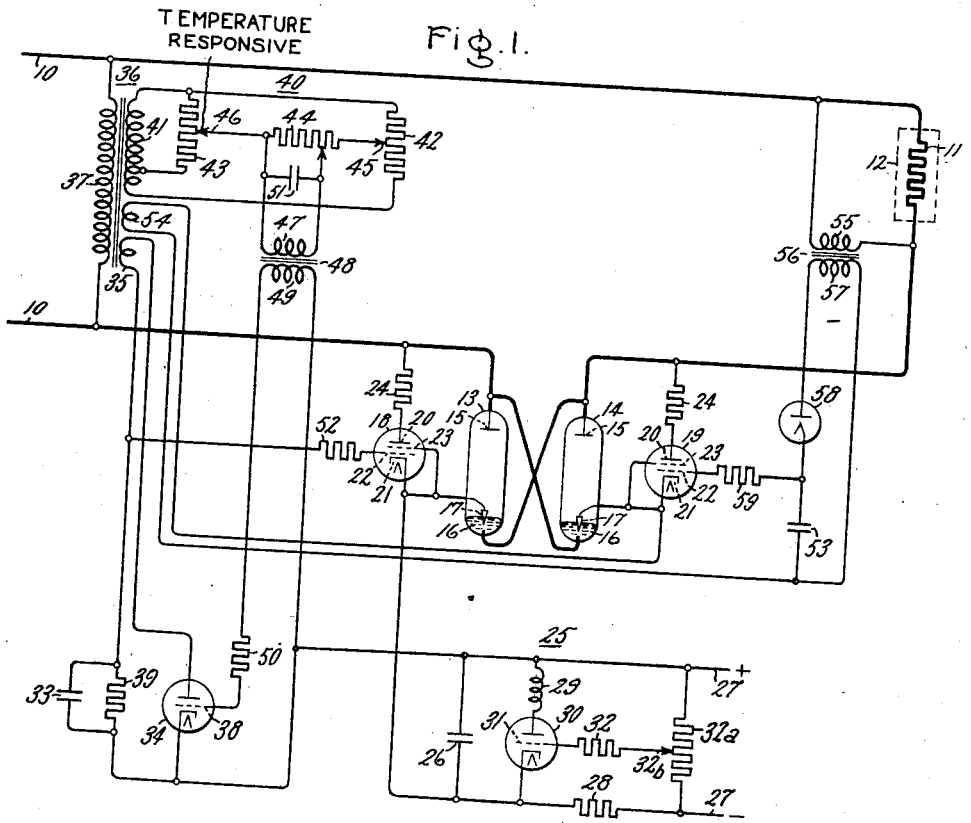
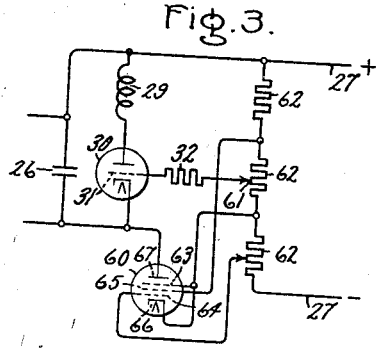
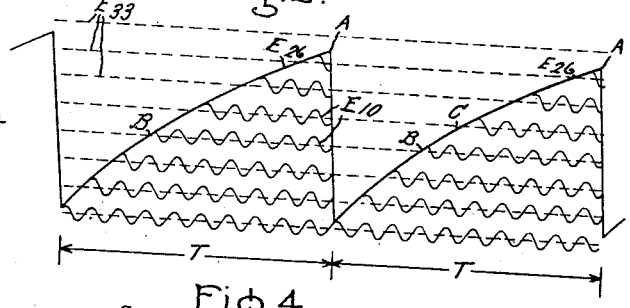
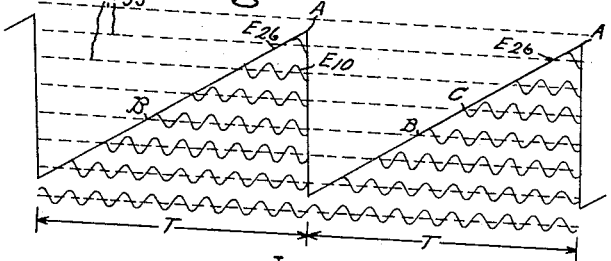
Inventors:
Harry L. Palmer,
Elbert D. Schneider,
by Harry E. Dunham
Their Attorney.

2,364,998

UNITED STATES PATENT OFFICE 2,364,998

ELECTRIC CONTROL CIRCUIT

Harry L. Palmer, Schenectady, and Elbert D. Schneider, Scotia, N. Y., assignors to General Electric Company, a corporation of New York Application August 13, 1941, Serial No. 406,598

9 Claims. (Cl. 250—27)

Our invention relates to electric control circuits, and more particularly to electric control circuits employing electric valve means for controlling the transfer of energy between supply and load circuits. The present invention is well adapted for controlling the energy supplied to an electric heating load such as the heating unit of an electric furnace, or the load circuit of a resistance welder.

It is an object of our invention to provide a new and improved electric control circuit.

It is another object of our invention to provide a new and improved electric control circuit including electric valve means for controlling the energy supplied to a load in accordance with a predetermined controlling influence.

It is a further object of our invention to provide a new and improved electric control circuit which is simple and reliable in operation and provides close regulation of a condition of the load which it is desired to maintain.

It is a still further object of our invention to provide a new and improved control circuit for electric translating apparatus including electric valve means in which variable amounts of power are transmitted by the electric valve means by varying the relative magnitudes of the conducting and nonconducting periods of the electric valve means.

In accordance with an illustrated embodiment of our invention, a pair of reversely connected electric valve means control the transfer of energy between an alternating current supply circuit and a load circuit such as the heating element of an electric furnace. The electric valve means are maintained conductive for a predetermined number of cycles of the alternating current supply circuit and nonconductive for a predetermined number of cycles of the alternating current supply circuit by a control circuit which includes means for producing a substantially saw-toothed wave of control voltage which tends to render the valve means conductive and a unidirectional control voltage opposing the saw-toothed wave of control voltage which varies in magnitude with the temperature or other condition of the load circuit. When the resultant of these two voltages becomes more positive than the critical voltage of a control electric valve associated with the main valve, the main valve is rendered conductive and in this way the time in the saw-toothed voltage wave at which the load circuit is energized is determined. The valve means are rendered non-conductive when the saw-toothed voltage reduces suddenly at the end of a cycle thereof and the period during which the valve means are non-conductive extends from that instant to the time in the saw-toothed voltage wave at which the resultant of the temperature responsive voltage and the instantaneous value of the saw-toothed voltage becomes more positive than the critical voltage of the control valve. Hence, for a given magnitude of control voltage corresponding to a given condition of the load circuit or device the electric valve means will be rendered conductive at the same time in each cycle of the saw-toothed voltage wave. If the magnitude of the control voltage dependent upon the load condition varies, the point in the saw-toothed voltage wave at which the main valves are rendered conductive is changed in a direction to restore a predetermined condition of the load. With this arrangement it is seen that it is possible for the electric valves to conduct their full rated current periodically when the energy required by the load is less than the continuous full load rating of the electric valves. It is also seen that the periods of on and off are established so that the system tends to seek a cycle of operation according to which the time that the valves are conducting will furnish just the required energy. The valves then become conductive and non-conductive for periods having the required duration to provide this result and it is not necessary that the temperature or other condition of the load change in order to change the valves from a conducting state to a non-conducting state for the given interval. That is to say, we obtain cyclic operation of the valves for a given temperature or load condition and vary the cycle for deviation in the condition.

Our invention will be better understood by reference to the following description taken in connection with the accompanying drawing, and its scope will be pointed out in the appended claims. In the drawing, Fig. 1 is a schematic representation of one embodiment of our invention, and Fig. 2 is a graph showing variations with time of certain of the electrical characteristics of the circuit of Fig. 1; Fig. 3 is a modification of a portion of the circuit of Fig. 1, and Fig. 4 is a diagram showing the variation with time of certain electrical characteristics of a circuit embodying the modification of Fig. 3.

In Fig. 1 we have shown our invention embodied in a circuit for transmitting controlled amounts of power from an alternating current supply circuit 10 to a load circuit which, in the particular embodiment illustrated, is the resistance element 11 of an electric furnace 12. The circuit between the supply and load circuits is completed through a pair of reversely connected main electric discharge valves 13 and 14 which are preferably of the type employing an ionizable medium such as a gas or vapor and, as illustrated, may comprise an anode 15, a pool of conducting liquid forming a cathode 16, and an immersion igniter type control member 17. As is well understood by those skilled in the art, when electric valve means of this character are reversely connected with respect to an alternating current supply circuit or, as sometimes stated, are connected in anti-parallel relation, they are effective to transmit alternating current to the load circuit.

In accordance with the present invention an improved control circuit is provided for controlling the current transmitted by the electric valve means by varying the number of half cycles of the alternating current circuit during which the valve means 13 and 14 are conductive and non-conductive rather than by controlling the portion of the half wave of the alternating current supply voltage during which the valves are conductive. As is well understood by those skilled in the art, the electric valve means 13 and 14 may be rendered conductive when the anodes thereof are positive with respect to the cathodes by the passage of a predetermined minimum current through the immersion igniter control member 17. The current through the control member 17 is controlled by the firing valves 18 and 19 which are preferably of the type employing an ionizable medium and each comprises an anode 20, a filamentary type cathode 21, a control member or grid 22, and a shield grid 23. As illustrated in the drawing, the firing valves 18 and 19 each has its anode connected with the anode of the main electric valve means with which it is associated through a suitable resistor 24. The cathode of each of the valves 18 and 19 is connected to the immersion igniter control member of the electric valve with which it is associated. In accordance with our invention we provide a new and improved control circuit for controlling the energization of the control members 22 of the firing valves 18 and 19 to determine the periods during which the main electric valve means 13 and 14 are conductive. To this end the control member 22 of electric valve 18 is energized by two components of control voltage, one of which varies cyclically at a frequency lower than that of the alternating current source and having a substantially saw-toothed wave form. The other voltage is a unidirectional voltage opposing the saw-toothed voltage and having a magnitude which may be varied manually or automatically in accordance with some condition to be controlled, such as, for example, the temperature of the load supplied by the main electric valve means 13 and 14.

Referring now to Fig. 1, the first component of control voltage has a substantially saw-toothed wave form and is produced by the circuit illustrated generally by the numeral 25. A capacitor 26 is charged from a suitable source of direct current 27 through a resistor 28. The direct current may be obtained in any suitable manner and may be derived from the alternating current circuit 10 through suitable rectifying means. If desired, a series connected reactor 29 and electric valve 30, preferably of the type employing an ionizable medium, are connected across the capacitor 26. The valve 30 is provided with a control member or grid 31, in series with which is connected a suitable current limiting resistor 32. The valve 30 and resistor 28 are connected in circuit so that the resistor 28 is connected between the cathode and control member of the valve to impress a negative voltage on the control member having a magnitude dependent on the magnitude of the condenser charging current. As capacitor 26 charges, the current flowing through the resistor 28 decreases and the control member of the electric valve 30 becomes less negative with respect to the cathode thereof and at some predetermined time in the charging cycle of the condenser 26 the valve 30 becomes conductive and the condenser is immediately discharged through the valve. The reactor 29 cooperates with the condenser to insure that the voltage across the valve is reduced to zero or reversed so that the grid 31 thereof may regain control. This cycle of operation is repeated automatically at a definite periodicity dependent upon the constants of the elements of circuit 25. If desired, a voltage divider 32a may be provided across the direct current source 27 with an adjustable tape 32b connected to the control member 31. This provides a bias opposing the voltage of resistor 32 and makes it possible to adjust the periodicity of the condenser charging cycle. The wave shape of the voltage appearing across the terminals of capacitor 26 is shown in Fig. 2 by the curve E26.

The voltage impressed between the cathode 21 and control member 22 of electric valve 18 also includes a unidirectional component of voltage appearing across a capacitor 33 which has a magnitude dependent upon a condition to be controlled and is in a direction opposing the cyclically varying voltage appearing across the terminals of capacitor 26. In the particular embodiment illustrated in Fig. 1 the voltage across the condenser 33 is controlled automatically in accordance with the temperature of the electric furnace 12. The capacitor 33 is connected in series with the anode-cathode circuit of an electric valve 34, preferably of the thermionic or high vacuum type and a source of alternating current voltage comprising a secondary winding 35 of a transformer 36 having the primary winding 37 thereof energized from the laternating current supply circuit 10. The valve 34 is provided with a control member or grid 38. A resistor 39 is provided in parallel with the capacitor 33 to facilitate changes in voltage across condenser 33 when the conductivity of valve 34 changes. The conductivity of the electric valve 34 is controlled in accordance with a condition to be controlled, such as the temperature of the electric furnace 12 by a bridge circuit illustrated generally by the numeral 40. The bridge circuit includes a source of alternating voltage comprising a secondary winding 41 of transformer 36 across which is connected a resistor 42 and across a portion of which is connected a second resistance 43. A resistor 44 is connected between an intermediate point on the resistor 42 and an intermediate point on the resistor 43 by movable contacts 45 and 46, respectively. The contact 45 is manually adjustable and the contact 46 is, in the particular arrangement illustrated, moved automatically in response to the temperature of the electric furnace 12 by any suitable means (not shown). With this arrangement it is apparent that after having adjusted the contact 45 the magnitude and direction of the current through resistor 44 will be determined by the position of the automatically controlled contact 46. The voltage across a portion of resistor 44 is impressed on the primary winding 47 of a transformer 48, the secondary winding 49 of which is connected to energize the control member 38 of the electric valve means 34 through a suitable current limiting resistor 50. A capacitor 51 connected across the primary winding 47 is of such value as to draw a leading current to compensate for the lagging current through the winding 47. One of the connections of the winding 47 with the resistor 44 is made adjustable to provide a sensitivity adjustment for the bridge circuit 40. By tracing the cathode to control member circuit of the electric valve 18 it is seen that it includes capacitor 26, across which appears the saw-toothed voltage produced by circuit 25, the capacitor 33, across the terminals of which appears a voltage dependent upon the temperature conditions of the electric furnace 12, and a suitable current-limiting resistor 52.

It will be noted that the control circuit thus far described relates entirely to the firing valve 18 associated with the main electric valve means 13. The firing valve 19 associated with electric valve 14 is controlled in response to a conducting period of the valve 13 in the following manner: The control member 22 of firing valve 19 is normally maintained at a negative potential with respect to the cathode thereof when the anode thereof is positive by the voltage across a condenser 53 energized from a secondary winding 54 of the transformer 36. When the main electric valve 13 is rendered conductive the current flow through the load 11 impresses a voltage on the primary winding 55 of a transformer 56, the secondary winding 57 of which is connected in circuit with the capacitor 53 through a unilaterally conducting device such as an electric discharge valve 58. The valve 58 is poled to charge the condenser in a direction to render the control member 22 of the firing valve 19 positive so that the valve 14 is automatically rendered conductive for each half cycle of the alternating current supply following a period of conduction of the valve means 13. A suitable current limiting resistor 59 is connected in series with the control member 23 of valve 19.

A better understanding of our invention and its operation may be had by a consideration of the embodiment described above and illustrated in Fig. 1, together with the characteristics schematically represented at Fig. 2. Referring to Fig. 2, the voltage produced across condenser 26 is illustrated by the curve $E_{26}$ which repeats each period designated by the letter T. The voltage across the capacitor 26 increases along the exponential curve $E_{26}$, having a shape dependent upon the condenser charging current until the point A is reached, at which time the electric valve 30 becomes conductive and the voltage across the capacitor 26 is rapidly reduced to a low value. When the valve is extinguished the voltage across the condenser 26 again builds up along the exponential curve to repeat the cycle and form another saw-toothed voltage wave. The horizontal dotted lines $E_{33}$ represent different values of the voltage across the condenser 33 corresponding to variations in the temperature of the load 11. The frequency of alternating current circuit 10 is illustrated in Fig. 2 by a timing wave $E_{10}$. If the temperature is higher than that for which the bridge circuit is adjusted the adjustable contact 46 is moved in a direction to vary the conductivity of electric valve 34 in a direction which will increase the magnitude of the voltage 33. For simplification in explanation let it be assumed that the critical voltage of the electric valve 18 lies along the zero axis. In such a case the valve 18 will become conductive when the voltage across condenser 33 and the voltage across condenser 26 are equal which will occur at the intersection of the curve $E_{26}$ and the horizontal line $E_{33}$ corresponding to the particular value of the voltage across condenser 33. Assume, for example, that when the load is at the temperature for which the bridge circuit is adjusted $E_{33}$ has such a value that the curve $E_{26}$ is intersected at B. Valve 18 is then rendered conductive at point B and conducts for a number of half cycles until the voltage across condenser 26 is reduced to a low value at the time electric valve 30 is rendered conductive. At this time the valve 13 will cease conducting and will remain non-conductive until the voltage across capacitor 26 again rises to a value equal to the voltage across condenser 33. If the voltage across condenser 33 has remained unchanged the valve 13 will be rendered conductive at the same point B. However, if due to an increase in temperature of the load 12 the voltage across condenser 33 has risen to a point C, the period during which the electric valve 13 is maintained conductive is decreased and the length of time during which it is non-conductive is increased. In other words, the circuit embodying the present invention provides for an on and off duty cycle of the main electric valves for equilibrium conditions with the relative length of the on and off periods of the cycle being varied in accordance with variations in the controlled condition. As explained earlier in the specification, valve 14 is rendered conductive as a result of conduction by valve 13 so that current is always conducted for both half cycles of the supply circuit 10. The system described above, therefore, gives a type of on and off control which does not require a departure in the condition controlled for maintaining a predetermined on and off duty cycle but only for varying the relative length of the on and off periods of the cycle.

In Fig. 3 is shown a modification of the circuit 25 in which means are provided for maintaining the charging rate of the condenser 26 substantially constant and in this way obtain the linear rise of voltage across the condenser 26 illustrated in Fig. 4. It is essentially the same as that illustrated in Fig. 1 but includes in addition an electric valve 60 connected in series with the supply circuit 27 and capacitor 26. The control member 31 of the valve 30 is maintained at a potential intermediate the terminals of the direct current circuit 27 by means of an adjustable contact 61 engaging one of a plurality of resistors 62 which are connected in series and across the direct current supply. The electric valve 60 is of the type having three control members 63, 64, 65 in addition to a cathode 66 and an anode 67. The control member 63 acts as a suppressor grid and is connected with the cathode 66 of the electric valve.

The second control member 64 is maintained at a voltage dependent upon the current supplied to the capacitor and the remaining control member 65 is maintained at a potential intermediate the terminals of the direct current supply 27. The operation of the embodiment illustrated in Fig. 3 when incorporated in the circuit of Fig. 1 is substantially that previously described. The linear characteristics of the voltage across condenser 26 is illustrated in Fig. 4 and the same letters have been used to designate corresponding points of operation. The effect of the change in shape of the saw-toothed wave is simply to change the amount of variation of the duty cycle that will result from a given change in the voltage across the condenser 33.

Although two modifications of the circuit 25 have been shown and described for obtaining a substantially saw-toothed wave of control voltage one of which increases linearly and one of which increases exponentially, it will be apparent that many other arrangements may be provided and may be adjusted to give any desired rate of increase of control voltage. For example, the charging current of the capacitor 26 may be controlled by the output of a photoelectric device which is cyclically varied by an obstruction disk of any desired shape.

While we have shown and described particular embodiments of our invention, it will be obvious to those skilled in the art that changes and modifications may be made without departing from our invention, and we therefore aim in the appended claims to cover all such changes and modifications as fall within the true spirit and scope of our invention.

What we claim as new and desire to secure by Letters Patent of the United States is:

1. In combination, an alternating current supply circuit, a load device having a condition to be controlled, electric translating apparatus interconnecting said circuit and said device including a reversely connected electric valve means having a control member, a control circuit for controlling the energization of said control member for maintaining said load device energized for a predetermined number of cycles of said alternating current circuit and deenergized for a predetermined number of cycles of said alternating current circuit for a given value of said condition, and means responsive to variations in said condition for varying in opposite directions the number of cycles that said load circuit is energized and deenergized to maintain a predetermined characteristic of said condition.

2. In combination, an alternating current supply circuit, apparatus having a condition to be controlled and including an electric load, electric translating apparatus interconnecting said circuit and said electric load including reversely connected electric valves, a control circuit for controlling the conductivities of said electric wires including means for rendering said valves conductive for a predetermined number of cycles of said alternating current supply circuit and nonconductive for a predetermined number of cycles of said alternating current supply circuit for a given value of said condition, and means for varying in opposite directions the number of cycles during which said electric valves are conductive and non-conductive in response to variations in said condition to maintain a substantially constant value of said condition.

3. In combination, a supply circuit, a load circuit, at least one of said circuits being an alternating current circuit, electric translating apparatus interconnecting said circuits including electric valve means having a control electrode associated therewith, a control circuit for controlling the energization of said control electrode including means for producing a cyclically varying control voltage having a periodicity less than the frequency of said alternating current circuit, means for producing a control voltage opposing said first voltage, and means operated in accordance with a condition controlled by the conductivity of said electric valve means to vary said opposing voltage and thereby to vary the portion of the cycle of said first-mentioned control voltage during which said electric valve means is conductive to maintain said condition continuously substantially constant.

4. In combination, a supply circuit, a load circuit, at least one of said circuits being an alternating current circuit, electric translating apparatus interconnecting said circuits including electric valve means having a control electrode associated therewith, a control circuit for controlling the energization of said control electrode including means for producing a cyclically varying control voltage having a periodicity less than the frequency of said alternating current circuit and which varies progressively to a predetermined value and then returns abruptly to its initial value at the end of each cycle of variation, and means for producing a control voltage opposing said first voltage which varies in magnitude in accordance with a condition controlled by the conductivity of said electric valve means to determine the portion of the period of said first-mentioned control voltage during which said electric valve means is conductive in accordance with variations in said condition.

5. In combination, an alternating current supply circuit, a load device, electric translating apparatus interconnecting said circuits including electric valve means having a control electrode, a control circuit for controlling the energization of said control electrode including means for producing a cyclically varying unidirectional control voltage which increases progressively to a predetermined value and then is reduced abruptly to its initial value at the end of each cycle of variation, and means for producing a unidirectional control voltage opposing said first-mentioned unidirectional voltage which varies in magnitude in accordance with a condition of said load device controlled by the conductivity of said electric valve means to determine the time in the cycle of said first-mentioned control voltage at which said electric valve means becomes conductive and thereby maintain said condition continuously substantially constant, the periodicity of said cyclically varying control potential being less than the frequency of said alternating current circuit.

6. A control system for maintaining a condition of the medium about an electric load substantially constant by effecting intermittent energization of the load comprising in combination, an alternating current supply circuit, an electric load circuit, electric translating apparatus interconnecting said circuits for transmitting alternating current to the load circuit and including reversely connected electric valve means having a control member, a control circuit for controlling the energization of said control member for maintaining said load device energized for a predetermined number of cycles of said alternating current circuit and deenergized for a predetermined number of cycles of said alternating current circuit for a given value said alternating current circuit for a given value said condition, and means responsive to variations in said condition for varying in opposite directions the number of cycles that said load circuit is energized and deenergized to maintain a predetermined characteristic of said condition.

7. A control system for maintaining a condition of the medium about an electric load substantially constant by effecting intermittent energization of the load comprising in combination, an alternating current supply circuit, an electric load, electric translating apparatus interconnecting said circuit and said load including electric valve means having a control member, a control circuit for impressing a periodic voltage on said control member to establish a control period, means for modifying said periodic voltage to maintain said load energized for a predetermined number of cycles of said alternating current supply circuit and deenergized for a predetermined number of cycles of said alternating current supply circuit for a given value of said condition, and means responsive to variations in said condition for varying the number of cycles of said alternating current circuit that said load is energized for each control period to maintain said condition at a predetermined value.

8. A control system for maintaining a condition of the medium about an electric load substantially constant by effecting intermittent energization of the load comprising in combination, an alternating current supply circuit, an electric load, electric translating apparatus interconnecting said circuit and said load for transmitting energy therebetween and comprising an electric valve means having a control electrode, a control circuit for controlling the energization of said control electrode including means for producing a periodic control voltage having a periodicity less than the frequency of said alternating current supply circuit for establishing a control period, and means responsive to the magnitude of said condition for producing a second control voltage for modifying the energization of said control electrode and thereby determine the portion of said control period during which said load is energized and the portion of said period during which said load is deenergized to maintain said condition substantially constant.

9. In combination, a supply circuit, a load circuit, at least one of said circuits being an alternating current circuit, electric translating apparatus interconnecting said circuits including electric valve means having a control electrode associated therewith, means for impressing on said control electrode a cyclically varying voltage having a periodicity less than the frequency of said alternating current circuit and which varies progressively to a predetermined value and then changes abruptly to its initial value at the end of each cycle of variation, means for impressing on said control electrode a voltage opposing said first voltage, and means for varying the magnitude of said last voltage in accordance with a condition of said load circuit controlled by the conductivities of said electric valve means to determine the portion of the period of said first mentioned control voltage during which said electric valve means is conductive and the portion of said period during which said electric valve means is nonconductive to maintain said condition substantially constant.

HARRY L. PALMER.
ELBERT D. SCHNEIDER.

CERTIFICATE OF CORRECTION.

Patent No. 2,364,998.   December 12, 1944.

HARRY L. PALMER, ET AL.

It is hereby certified that error appears in the printed specification of the above numbered patent requiring correction as follows: Page 2, second column, line 24, for "tape" read --tap--; line 48, for "laternating" read --alternating--; page 4, first column, line 55, claim 2, for "wires" read --valves--; and that the said Letters Patent should be read with this correction therein that the same may conform to the record of the case in the Patent Office.

Signed and sealed this 20th day of March, A. D. 1945.

Leslie Frazer (Seal)                        Acting Commissioner of Patents.